(12) United States Patent
Rooijmans et al.

(10) Patent No.: US 9,868,130 B2
(45) Date of Patent: Jan. 16, 2018

(54) ROLL COATING PROCESS AND APPARATUS

(71) Applicant: DSM IP ASSETS B.V., Heerlen (NL)

(72) Inventors: Marnix Rooijmans, Echt (NL); Kay Marie Allan Biesmans, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/420,014

(22) PCT Filed: Aug. 6, 2013

(86) PCT No.: PCT/EP2013/066445
§ 371 (c)(1),
(2) Date: Feb. 6, 2015

(87) PCT Pub. No.: WO2014/023716
PCT Pub. Date: Feb. 13, 2014

(65) Prior Publication Data
US 2015/0217322 A1 Aug. 6, 2015

(30) Foreign Application Priority Data
Aug. 9, 2012 (EP) .................................. 12179860

(51) Int. Cl.
*B05C 1/08* (2006.01)
*B05D 5/06* (2006.01)
(Continued)

(52) U.S. Cl.
CPC .............. *B05C 1/08* (2013.01); *B05C 5/0241* (2013.01); *B05D 1/28* (2013.01); *B05D 5/061* (2013.01);
(Continued)

(58) Field of Classification Search
CPC ........ B05D 1/28; B05D 1/40; B05D 2252/04; B05D 2252/00; B05C 1/083
See application file for complete search history.

(56) References Cited

U.S. PATENT DOCUMENTS 3,756,196 A * 9/1973 Furuuchi ................ C03C 17/00
  118/238
4,370,356 A    1/1983 Bok et al.
5,639,517 A * 6/1997 Floch ....................... B05C 9/02
  427/165

FOREIGN PATENT DOCUMENTS

DE    20 2007 01473    12/2007
EP       0 376 207       7/1990
(Continued)

OTHER PUBLICATIONS

International Search Report for PCT/EP2013/066445, dated Sep. 30, 2013.

Primary Examiner — Alex A Rolland
(74) Attorney, Agent, or Firm — Nixon & Vanderhye P.C.

(57) ABSTRACT

The invention relates to a roll coating process for applying a coating layer on a non-continuous sheet, comprising the steps of 1) applying a liquid coating composition to the top surface of the sheet by passing the sheet horizontally between an applicator roll and a backing roll; 2) forwarding the coated sheet with a coated sheet forwarder; wherein forwarding is interrupted after passing the applicator roll while maintaining a meniscus of liquid coating composition between stopped sheet and rotating applicator roll, and forwarding is restarted when the meniscus has disappeared. With this process it is possible to make sheets coated with an optical coating like an anti-reflective coating, which sheets show markedly smaller and less visible edge defects, especially at the trailing edge. The invention also relates to a roll coating apparatus suitable for operating the process of (Continued)

Figure 1:
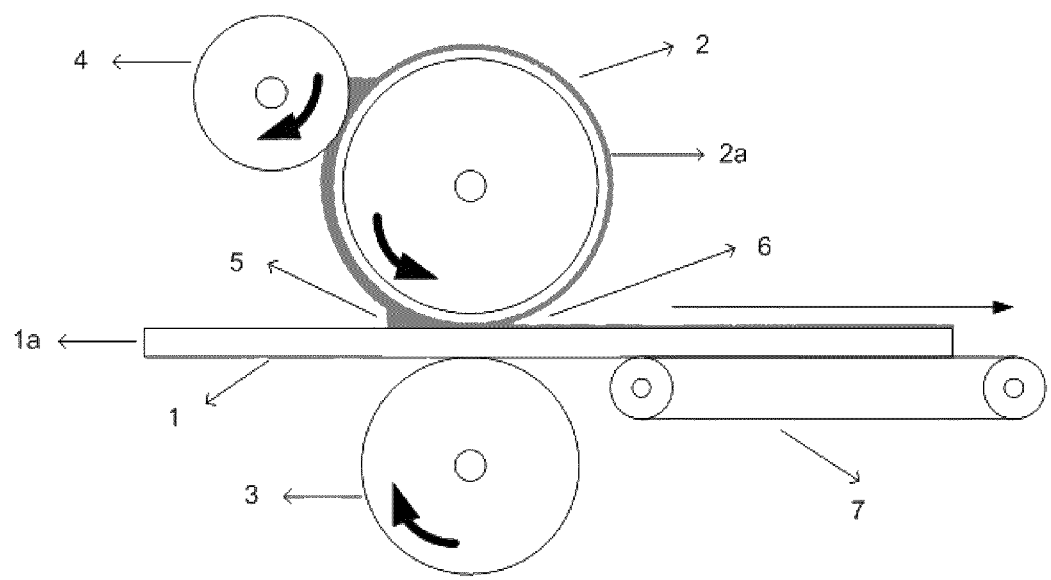

the invention, which apparatus comprises at least an applicator roll, a backing roll, a coated sheet forwarder, and control means to operate the sheet forwarder depending on the position of a sheet in the apparatus.

18 Claims, 2 Drawing Sheets

(51) Int. Cl.
*B05D 1/28* (2006.01)
*B05C 5/02* (2006.01)
*G02B 1/11* (2015.01)

(52) U.S. Cl.
CPC ............ *G02B 1/11* (2013.01); *B05D 2203/35* (2013.01); *B05D 2252/02* (2013.01)

(56) References Cited

FOREIGN PATENT DOCUMENTS

| | | | |
|---|---|---|---|
| GB | 1 600 616 | 10/1981 | |
| JP | EP 0376207 A2 * | 7/1990 | ........... B05C 1/0826 |
| WO | WO 2006/124831 | 11/2006 | |

\* cited by examiner

ROLL COATING PROCESS AND APPARATUS

This application is the U.S. national phase of International Application No. PCT/EP2013/066445, filed 6 Aug. 2013, which designated the U.S. and claims priority to EP 12179860.7, filed 9 Aug. 2012, the entire contents of each of which are hereby incorporated by reference.

The invention relates to a roll coating process for applying a coating layer on a non-continuous sheet, comprising the steps of applying a liquid coating composition to the top surface of the sheet by passing the sheet horizontally between an applicator roll and a backing roll; and forwarding the coated sheet with a coated sheet forwarder.

The invention also relates to a roll coating apparatus comprising at least an applicator roll, a backing roll, and a coated sheet forwarder; and to a method for making an anti-reflective coated transparent substrate.

Roll coating is a widely used process for applying a uniform thin layer of a liquid coating composition to a moving substrate, often to a generally flexible, continuous substrate like a thin metal sheet or a polymer film, also called a continuous or travelling web. Such coating process typically comprises the use of at least two rolls (also called rollers); wherein the substrate is passed and forwarded between and by a guide or backing roll, and an applicator roll that transfers coating liquid from a feed to the substrate. An overview of coating techniques including roll coating is for example given by E. D. Cohen and E. B. Gutoff in Encyclopedia of Polymer Science and Technology, 2001, Vol. 1, 635-670 (or DOI: 10.1002/0471440264.pst061). In a typical roll coating process the applicator roll is positioned at such distance from the surface of the moving substrate on the guide roll that a meniscus of the coating liquid is maintained, bridging the narrow gap or nip between the rolls. Upon exiting the gap the coating liquid splits in two, with some adhering to and forming a coating layer on the moving substrate and some to the applicator roll. The applicator roll may have a surface layer provided with recesses or gravures that contain the coating liquid, like a series of grooves, in order to better pre-meter the amount of coating liquid to the substrate. If the applicator roll rotates or moves in the same direction as the substrate, the process is referred to as "forward roll coating"; whilst in "reverse roll coating" the applicator roll surface moves in other direction than the substrate. Numerous publications address optimisation of such roll coating processes for continuous substrates; including J. Non-Newton. Fluid Mech. 14 (1984) 377-389, J. Non-Newton. Fluid Mech. 130 (2005) 96-109, and Annu. Rev. Fluid Mech. 36 (2004) 29-53. Thickness and uniformity of the applied coating layer is dependent on many variables, like roll speed, roll surface hardness and structure, distance between the rolls, forwarding speed of substrate, rheological properties of the liquid coating composition, and substrate surface. Defects in the applied coating layer, like bubbles, streaks or ribs, can for example result from air entrainment in the coating liquid between the rolls, and from instabilities in the liquid film splitting that occurs between applicator roll and substrate.

A roll coating process can also be used for applying a layer of a liquid coating composition to a non-continuous or discontinuous substrate of finite length (also called discrete or individual substrate), in addition to continuous webs. Such non-continuous substrate may optionally be rigid; for example a flat panel or plate like a glass sheet or a wood panel. Such process is herein referred to as "sheet coating", whereas the term "web coating" is used for continuous substrates. In general, processing of a web is less complex and more flexible than coating a piece of sheet; as a web can be provided on a roll, un-rolled, coated and re-rolled in a continuous "roll-to-roll" operation. A non-continuous or discrete substrate, hereinafter also shortly "sheet", is typically fed to an applicator roll with a sheet feeder, and after passing the applicator roll the sheet is forwarded with a coated sheet forwarder or transporter (e.g. with rolls or transporting belts). In such sheet coating process generally also a backing roll is used, which is within the context of this description understood to include a roll, but also a transport or conveyor belt, or other element that provides the same function. Applicator and backing rolls together also play a role in moving the substrate when they are pressed on the substrate. Typically, sheets are moved and coated in substantially horizontal position with the coating being applied to the top surface of the sheet, whereas a web may be coated in other orientations as well. Such sheet roll coating process is significantly different from a so-called meniscus coating process, wherein a layer of coating liquid is applied to the bottom surface of a substrate via a meniscus of coating liquid formed between substrate surface and permeable surface of a cylinder through which coating liquid is provided; as described in a.o. U.S. Pat. No. 4,370,356 and U.S. Pat. No. 5,639,517.

Sheets that are coated via a roll coating process also tend to show some additional coating defects compared to continuous substrates. As a sheet is fed to and later leaves the combination of applicator and backing rolls, the coating process needs to start, become stable, and end for each sheet. This may result in distinct differences in coating layer thickness at the areas close to the sides of the surface (edges) and at the centre of the sheet; more specifically at the onset ("first touch" at the leading edge of top surface of the sheet) and offset ("last touch" at the trailing edge of the sheet) versus the centre of the sheet. Especially at the offset the coating layer may be up to 5-10 times thicker over an area of several millimeters from the edge than in the centre; such thick coating edge area or band is also called "fat edge". Such coating thickness variations may be very visible to the human eye. For example in case of an optical coating like an anti-reflective (AR) coating, thickness variations may be seen as areas having different colour, transparency, and/or lustre; and are generally commercially unacceptable. Although various parameters in the roll coating process have been (proposed to be) evaluated to reduce these edge defects, see for example J. P. F. Charpin et al., Proceedings ESGI82 (2011), 4-25 (available via http://www.macsi.ul.ie/esgi82/), a satisfying solution—especially for forward roll coating—has not been found. Sheet coating is a commercially relevant technology though, because some materials are difficult or impossible to be cut to a desired size; like tempered or safety glass.

There thus remains a need in industry for a sheet coating process that results in coated sheets showing less edge defects like fat edges.

It is therefore an objective of the present invention to provide such an improved process.

The solution to above problem is achieved by providing the process as described herein below and as characterized in the claims.

Accordingly, the present invention provides a roll coating process for applying a coating layer on a non-continuous sheet, comprising the steps of i. Applying a liquid coating composition to the top surface of the sheet by passing the sheet horizontally between an applicator roll and a backing roll;

ii. Forwarding the coated sheet with a coated sheet forwarder;

wherein forwarding is interrupted by stopping the sheet after passing the applicator roll while maintaining a meniscus of liquid coating composition between stopped sheet and rotating applicator roll, and restarting forwarding when the meniscus has disappeared.

Within the context of the present application a non-continuous sheet is defined as a discontinuous or discrete substrate of certain finite length, and having top and bottom surfaces and sides. Preferably the sheet in the process of the invention is a flat panel or plate, with thickness significantly smaller than length and width. Such sheet may have some flexibility to allow a certain degree of bending, but typically is non-flexible and rigid (i.e. self-supporting under its own load when a sample is locally supported at spots about 1 m apart). The geometry and size of the sheet is not critical, but preferably the sheet is of a uniform thickness and size, to allow reproducible and homogeneous coating. Use of rectangular rigid sheets is preferred, as the advantages of the process according to the invention are most apparent at edges thereof. The edges of the sheet may have various different forms, and may be sharp (e.g. about) 90°, rounded, or facetted.

With the roll coating process of the invention it is found possible to make sheets provided with a coating applied from a liquid coating composition, which coated sheets show markedly smaller and less visible edge defects, especially at the trailing edge. The process of the invention can be advantageously used to apply coatings from a wide variety of liquid coating compositions; for example having viscosity within a wide range, including low viscosity sol-gel coating compositions.

In the process according to the invention a liquid coating composition is applied to the top surface of the sheet by passing the sheet horizontally between an applicator roll and a backing roll. Said process may further comprise a step of drying the applied coating, wherein the sheet is also kept horizontally—e.g. until the coating has solidified- to secure a homogeneous layer thickness. Within the context of this application horizontally (or substantially horizontal) is understood to include a completely horizontal plane as well as small deviations therefrom which do not significantly affect forming a coating layer of homogeneous thickness. Allowable deviations from horizontal may depend on various parameters, like viscosity of the liquid coating composition and thickness of the applied wet layer. Deviation from a horizontal plane during applying a coating, forwarding, and optionally drying is typically at most 10° (degrees), preferably at most 5°, or 3, 1, 0.5, 0.1°.

The process according to the invention may also comprise steps of
i. Feeding the sheet to an applicator roll with a sheet feeder;
ii. Applying a liquid coating composition to the top surface of the sheet by passing the sheet horizontally between the applicator roll and a backing roll; and
iii. Forwarding the coated sheet with a coated sheet forwarder.

The sheet feeder preferably provides the sheet to applicator roll and backing roll in a substantially horizontal position, and aligned with these rolls. The feeder may comprise multiple rolls, a transport or conveyor belt, or other means as known to a skilled person.

Preferably, in the process according to the invention a rectangular sheet is passed between applicator and backing rolls with its sides parallel and perpendicular to the forwarding direction; meaning that its leading (front) and trailing (end) edges are aligned with and substantially in parallel with axis (and surface) of the applicator roll. Substantially parallel means that the edges may be at a small angle with said axis, but are preferably fully aligned with the applicator roll. The sheet may be flexible or rigid, and be made from a plastic or a glass material.

The process according to the invention may further comprise one or more steps of cleaning and/or pre-treating the sheet, to remove any contaminants or improve spreading or adhesion of the coating layer to be applied; as is known to a person skilled in the art. Pre-treating the sheet may also comprise applying a further coating layer to enhance adhesion or other properties of the coating layer.

In a preferred embodiment of the process according to the invention the sheet is transparent, for example a polycarbonate, PET, or a glass plate, which is e.g. provided with an optical coating. Within the context of this description an optical coating is understood to be a coating layer on an optical component, which coating changes reflection or transmission of light of the component, and has dry layer thickness below 1 μm; like an anti-reflective (AR) coating.

The inventors surprisingly found that temporarily stopping transportation of the coated sheet just as the sheet is leaving the gap between applicator and backing roll, while (initially) maintaining a meniscus of coating liquid between sheet and applicator roll, reduces the fat edge effect. Although not wishing to be bound by any theory, the invention will now be explained in more detail by discussing a roll coating process with reference to some exemplary drawings and embodiments as shown in the figures. The process of the invention is preferably applied as a forward roll coating process.

FIG. 1 schematically illustrates a process of forward roll coating a sheet, by a simplified cross-sectional side view of part of the equipment used.

Figure 2A:
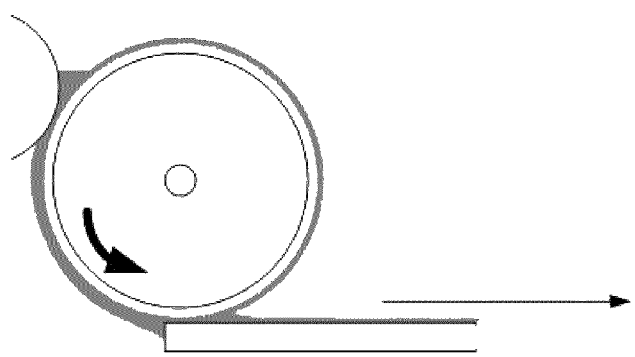
Figure 2B:
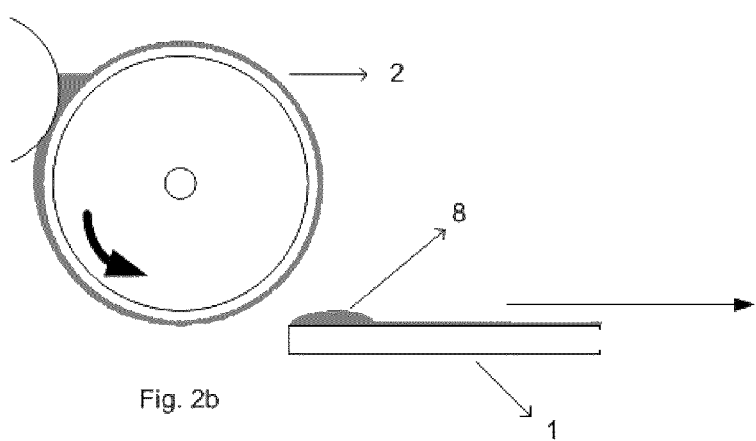
Figure 3A:
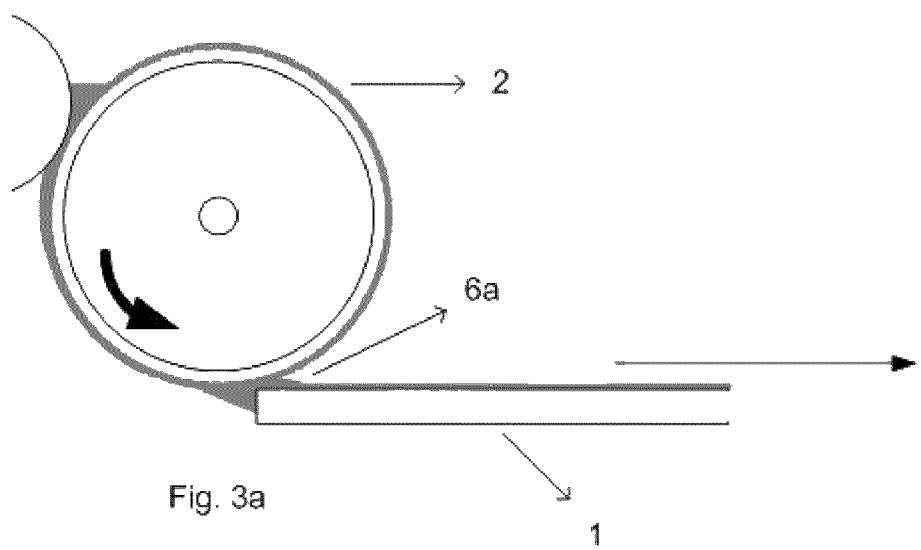
Figure 3B:
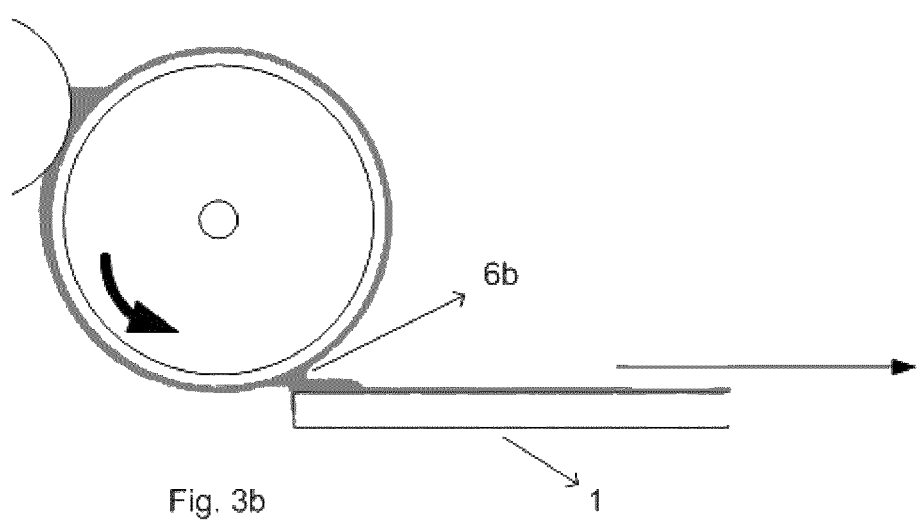

FIGS. 2a and 2b illustrate schematically forming of a fat edge in a prior art process, whereas in FIGS. 3a and 3b situations in the process of the invention are shown. In general, the figures as given herein may not show all parts or components of an apparatus used in a roll coating process, or may not represent them to scale. Like parts are indicated by the same numerals in the various figures.

In FIG. 1 a flat rectangular sheet 1 with trailing edge 1a is depicted. The sheet is fed from the left side (e.g. with a sheet feeder; not shown) to the gap between applicator roll 2 and backing roll 3 (rotating directions shown by arrows), and the sheet moves in the right direction (indicated by the arrow). The sheet is moved and coated in a substantially horizontal plane, to result in a uniform thickness of the applied wet coating layer. Instead of a roll, also a transporting belt or the like can be used as backing roll. The rolls are generally made from a hard material, like metal or ceramic for good dimensional control and processing stability. The rolls, especially applicator roll 2 may optionally be provided with a surface layer 2a made from a different material than the remainder of the roll. In a preferred embodiment of the invention, the applicator roll has a deformable surface layer, preferably a surface layer made from an elastomeric material like an EPDM rubber or (thermoplastic) polyurethane. The advantage hereof is that the process can be operated with a narrow gap, or even with a gap or nip that is smaller than the thickness of the substrate to be coated (also referred to as "negative gap"; distinguishing from a "positive gap" that is larger than substrate thickness and typically used with rigid rolls). In such case the applicator roll is pushed against the substrate and backing roll, which results in improved homogeneity for thin coating layers. The elastomeric material of the surface layer can have a hardness chosen from a wide range, but preferably a relatively soft material is applied; for example with a hardness of about 20 to 90 Shore A, preferably of 35-60 or 40-55 Shore A.

In another preferred aspect of the process of the invention, an applicator roll is used that has a surface engraved structure, also called a gravure roll. Such a roll with recesses in its surface is preferred as it can retain and deliver a well-controlled amount of liquid coating composition, especially of low viscosity, to the substrate. The roll may be provided with various types of engravings, for example as a series of recesses like pyramidal, quadrangular, or hexagonal cells arranged in different patterns. The recesses may be individual or connected to each other with channels. Preferably, the surface is provided with grooves. The grooves may be discontinuous or continuous, like at least one groove that spirals around the roll. The grooves can have various different designs; preferably triangular or V-shaped grooves are used. A typical triangular groove has an angle of about 50-120° or 65-115°, preferably 70-90°. It should be realised that in practice V-grooves may have rounded bottom and edges; as it is difficult to make real triangular grooves and the surface of the roll, including grooves, are subject to wear during use. The type and number of grooves may vary depending on coating composition used and desired coating layer thickness. Good results were obtained with a grooved roll having about 70-120 TPI (tracks per inch), preferably a roll with 90-115 TPI is used for low viscosity coating compositions.

Preferably, the applicator roll in the process of the invention has a deformable surface layer with an engraved structure as described above. Such applicator roll can be used for applying coating liquids of rather different viscosities (low shear viscosity from about 0.7 to more than 10000 mPa·s), but is especially suitable for use with (very) low viscosity coating compositions of about 1-1500, or 1-500 mPa·s. A further advantage is that it allows depositing of wet layers with thickness as low as one micron.

The applicator roll that is used in the process of the invention can have different diameters, also depending on its length. A large diameter will result in a stiffer and dimensionally more stable roll, and thus in better control of coating layer thickness and homogeneity; whereas a lower roll diameter may result in less offset (end defects). Generally, in the process according to the invention an applicator roll of diameter 100 to 500 mm is applied, preferably of 200-400 mm. The length of the roll may vary considerably, and depends on the width of sheets that should be coated.

The position of the applicator roll relative to the backing roll can be controlled and adjusted by vertically moving the applicator roll to different positions relative to the backing roll, which generally is in a fixed position. In this way the distance (gap) between backing roll and applicator roll can be accurately set. The gap can even be set somewhat smaller than the thickness of sheet 1 (called negative gap), resulting in some deformation of deformable roll 2 upon contacting the surface of the sheet and better control of the amount of coating liquid deposited on the sheet.

In a preferred embodiment of the invention, the process is operated with a negative gap between applicator roll with deformable surface layer and backing roll.

In the process according to the invention a surface layer of liquid coating composition can be applied to the applicator roll 2 with various known methods, preferably the amount of liquid coating composition is controlled by applying it with a metering or dosing device, e.g. with a dosing roll 4. Typically in the process according to the invention so much coating liquid is applied to the roll that results at least in formation of an upstream puddle of liquid 5 between substrate surface and applicator roll, optionally in a downstream puddle at the film split 6, and some coating liquid remaining at the roll surface and/or in the recesses after the film split (in the figures coating liquid is represented in grey). The puddle 5 is important as it functions to fully wet the surface of roll 2 and as a closure or seal for recesses on the roll surface to prevent air entrainment (which would otherwise result in air bubbles in the coating liquid and in coating defects). After passing the rolls, the coated sheet is transported by forwarder 7 to for example subsequent drying and curing steps.

In FIG. 2 it is schematically shown how—according to the inventors—a fat edge may be formed in a sheet coating process. Starting from the situation represented in FIG. 1 the process evolves into the situation of FIG. 2*a*, wherein the sheet almost leaves the gap area (only part of sheet, and backing roll not shown). It was observed that at this point at least part of the liquid puddles 5 and 6 are transferred to the trailing edge of the moving sheet, where it forms a relatively thick coating layer 8 at the edge of the sheet (FIG. 2*b*). This "excess" of coating liquid may partly level and spread over a larger area, as a result of gravity and depending on coating properties (viscosity, surface tension, drying time, etc.) and the substrate; resulting in a thicker coating also after optional steps of drying and curing the coating. This fat edge formation may be reduced to some extend by optimising various process parameters, as known from literature and as indicated below.

FIG. 3 illustrates the solution presented by the current invention. Starting from the situation in FIG. 2*a*, forwarding of the sheet is stopped to create the situation of 3*a* or 3*b*. In these situations, sheet forwarding has stopped while the applicator roll continues rotating, at such position that the coating liquid still forms a film bridging between the rotating applicator roll and the edge of the stopped sheet (a meniscus of coating liquid 6*a* or 6*b* is maintained). In principle, it is also possible to move the sheet slightly beyond said point, and then to move it backwards such that a meniscus is formed again. This way of operating the process is considered to be included in the process of the invention. Reforming a meniscus, however, may be difficult; and if successful a process including such step of restoring a meniscus may be less effective in reducing a fat edge, likely because of the excess of coating liquid being already somewhat levelled over a larger surface of the sheet.

In this process step excess of coating liquid on the sheet edge and bridging via the meniscus to the applicator roll, is now at least partly taken away by the passing surface of the applicator roll, including any recesses or grooves if present therein. During this step, the meniscus may be observed to decrease in size. For example, the meniscus may initially be present over the full width of the sheet, and then start disappearing from one side to the other. This removal of excess coating liquid will stop when the meniscus has broken or disappeared completely. Forwarding of the coated sheet can then be restarted. Preferably, the applicator roll has a deformable roll surface, and more preferably the surface contains recesses, as these are found to positively affect this excess liquid removal effect.

In the process according to the invention the sheet to be coated is preferably rectangular, and especially its end side at which a fat edge may develop is preferably fully aligned, that is in parallel with the applicator roll axis and surface for efficient and effective removal of excess coating liquid.

Forwarding of the sheet can be stopped when the sheet edge is still in contact with the applicator roll, as shown in FIG. 3a. A potential disadvantage of this position can be transfer of additional coating liquid from the roll to the end side of the sheet, specifically in case the applicator roll surface is deformed by such contact. In a preferred embodiment of the invention, therefore, the sheet forwarding is interrupted after passing the applicator roll at such position that the sheet only 'touches' the surface of the applicator roll, or—more precisely—touches the coating liquid on the surface of the applicator roll, and a meniscus is maintained.

In a further preferred embodiment of the invention, the sheet forwarding is interrupted by stopping the sheet at such position that the sheet end does not deform the surface of the applicator roll, but only contacts the surface via the meniscus of coating liquid (see FIG. 3b). Stopping of the sheet at such position may also be effected by a stop-start sequence to optimally position the sheet edge relative to the applicator roll surface.

In a further preferred embodiment of the process according to the invention sheet forwarding is interrupted after the sheet passing the applicator roll, and the applicator roll is moved upward to a new position such that the sheet does not contact or deform the surface of the applicator roll anymore, but a meniscus of liquid coating composition between stopped sheet and rotating applicator roll is maintained. These steps may be performed sequentially or simultaneously. Preferably stopping of forwarding and moving the applicator roll is done simultaneously. The advantage of such combined action is better control over maintaining a coating liquid meniscus, and more effective removal of excess coating liquid from the sheet edge; with little loss in overall productivity caused by additional processing steps.

In an alternative embodiment of the process according to the invention sheet forwarding is interrupted after passing the applicator roll and the sheet is moved downwards, such that the sheet does not contact or deform the surface of the applicator roll anymore, but a meniscus of liquid coating composition between stopped sheet and rotating applicator roll is maintained. The sheet may be somewhat moved away from the applicator roll for example by lowering of the backing roll and/or the sheet forwarder. These steps may be performed sequentially or simultaneously. Preferably stopping of forwarding and moving the sheet is done simultaneously.

In another preferred embodiment of the invention, the process further includes a step of adjusting rotation speed of the applicator roll simultaneously with or just after stopping of sheet forwarding, to further optimise efficiency of excess coating liquid removal. An increased speed is found to increase and speed-up liquid take away, that is to shorten the time wherein the initially maintained meniscus fully disappears, and thus to reduce interruption time and increase overall productivity.

In the process according to the invention the distance between sheet and applicator roll at which the sheet forwarding is to be interrupted, and which can optionally be controlled by moving upward of the applicator roll (or moving downward of sheet), will be dependent on several variables; including coating liquid properties like rheology or surface tension, forwarding speed, rotation speed of applicator roll, applicator roll surface properties (recesses, deformation), sheet edge geometry, etc. The skilled person will be able to identify proper conditions by some experiments; initially maintaining a meniscus being a critical parameter. Typically, the distance between sheet and applicator roll will be in the range of about 0.1-2 mm for effective fat edge reduction.

In the process according to the invention interruption of sheet forwarding is preferably continued until excess coating liquid is taken away as much as possible by the applicator roll, which is generally visible as the meniscus disappearing over the full width of the sheet. The interruption time is dependent on several variables, as indicated above for the position to interrupt (distance of sheet to applicator roll surface, and rotation speed of applicator roll). The skilled person will be able to identify proper timing and conditions by some experiments. Typically, the time of interrupting the forwarding of the coated sheet will be about 1-15 or 2-10 seconds for effective fat edge reduction. After this interruption time the coated sheet can be forwarded again for further processing steps, the applicator roll can be moved to its former position, roll speed may be reset to original value, and a new sheet can be fed to the applicator and backing rolls.

In a preferred embodiment of the process according to the invention interrupting (stopping and restarting) of forwarding the coated sheet is accompanied with simultaneously interrupting feeding of a new sheet to be coated, to optimise overall efficiency of the process.

The process according to the invention may also comprise other steps or measures that aid in further suppressing edge defects, as already known from prior art. For example, a coating composition with higher solids content can be used to reduce wet film thickness, or a composition of other viscosity may be applied. Alternatively, the temperature during applying and drying the coating composition may be adjusted to better control e.g. solvent evaporation and change in rheological properties of the coating.

In a preferred embodiment the process according to the invention further comprises a step of reducing the upstream liquid puddle by lowering the amount of coating composition that is dosed to the applicator roll before the sheet has fully passed the applicator roll, while taking care that the puddle does not completely disappear. Dosing of coating composition can be reduced in one or more steps, or even continuously during coating of a single sheet. Preferably dosing is reduced depending on progress of sheet coating; i.e. the amount of coating dosed is only reduced towards the end of a sheet coating sequence, to minimise the excess of coating liquid that can be transferred to the trailing edge of a sheet. In case a dosing roll is used in the process according to the invention, also the pressure with which the dosing roll is contacted with the applicator roll may be (dynamically) varied to adjust the amount of coating liquid dosed.

The described and optionally subsequent steps in the process according to the invention, like restarting the forwarding may for example be controlled by setting intervals with adjustable timers or other control means. Suitable time intervals can be determined by performing some experiments, and will be dependent on type of sheet and its size, and other process variables.

The invention further relates to a roll coating apparatus suitable for operating the process according to the invention, which apparatus comprises at least an applicator roll; a backing roll; a coated sheet forwarder; and control means to operate the sheet forwarder, i.e. to stop and restart forwarding, depending on the position of a sheet in the apparatus.

The apparatus according to the invention comprises a coated sheet forwarder and control means to operate the sheet forwarder depending on the position of a sheet in the apparatus. Sheet forwarding devices are known to a skilled person, and are also referred to as outlet table. Suitable devices can comprise sets of rolls, one or more transporting belts, etc. The means to operate the sheet forwarder depending on the position of a sheet in the apparatus serve amongst others to interrupt forwarding of a sheet during operation, and preferably include at least one sensor to determine the location of the (edge of the) sheet, and to actually stop the forwarding at the desired location. Alternatively, the coated sheet may not be actively transported by the sheet forwarder until a complete coating sequence, including excess liquid removal as described above for the process according to the invention, has finished. In such case forwarding of the sheet is initially done by feeder and/or applicator/backing rolls, which forwarding automatically stops when the sheet has passed the rolls. Preferably, the sheet forwarder of the apparatus comprises a breaking mechanism, like an adjustable level of friction between sheet and contacting surface of the forwarder, to receive the moving sheet (without reducing its speed to secure application of uniform coating layer thickness), and to stop the coated sheet at the desired position once it has passed the rolls.

The apparatus according to the invention preferably also comprises at least one controller, like a timer, for setting adjustable intervals to perform the various steps of the process according to the invention; like restarting forwarding of the coated sheet.

In a preferred embodiment the apparatus according to the invention further comprises positioning means to move the applicator roll up and down to different positions relative to the backing roll. These means to move the applicator roll can during operating the apparatus be used to set and control the gap between applicator and backing roll, and to create a desired distance between applicator roll and trailing edge of a sheet of which forwarding has been interrupted. Preferably these means allow coordinated, like simultaneous, operation with the control means to operate the sheet forwarder. To enable a well-controlled coating process, said means are preferably able to position the applicator roll with high accuracy, preferably actual values for distance to backing roll deviate at most about 0.1 mm, more preferably at most 0.05 mm from set values.

The apparatus according to the invention preferably further comprises any feature and functionality as described herein above for the process according to the invention, or as is known from literature.

The invention further relates to a method for making an anti-reflective (AR) coated transparent non-continuous substrate comprising the steps of
applying a liquid AR coating composition to the substrate with the roll coating process according to the invention; and
drying and curing the applied coating layer.

A liquid AR coating composition typically comprises at least one binder, at least one pore forming agent, and at least one solvent. Suitable compositions comprise binders based on organic and/or inorganic compounds, like those compositions that result in porous inorganic oxide, for example silica, coatings. Such compositions have been described in numerous publications; including EP0597490, U.S. Pat. No. 4,830,879, U.S. Pat. No. 5,858,462, EP1181256, WO2007/093339, WO2008/028640, EP1674891, WO2009/030703, and WO2011/157820.

In the method according to the invention a liquid coating composition may be used that comprises as binder at least one inorganic oxide precursor, which upon drying and especially curing the composition will form a film and bind together particles that may be present in the coating, giving mechanical properties to the AR layer and adhesion to the substrate. The inorganic oxide precursor can be an inorganic metal salt or an organo-metallic compound, preferably a metal alkoxide, and combinations thereof. Within the present application silicon (Si) is considered to be a metal. Suitable metals include Si, Al, Ti, Ta, Nb and Zr, and mixtures thereof. Preferred precursors include Si alkoxides like tetramethoxysilane (TMOS), tetraethoxysilane (TEOS), methyltrimethoxysilane, methyltriethoxysilane, titanium tetraisopropoxide, aluminium nitrate, aluminium butoxide, yttrium nitrate and zirconium butoxide. Such compounds can have been pre-reacted or pre-hydrolysed to form oligomeric species, typically in the form of nano-sized particles. More preferably, the at least one precursor comprises TMOS and/or TEOS.

The coating composition used in the method according to the invention further contains at least one pore forming agent, which helps in generating suitable porosity in the final AR layer to provide the desired refractive index. The coating composition already contains solvent and organic ligands from organo-metallic precursor compounds. These compounds as such will already induce some porosity to the inorganic oxide layer. Preferably the composition comprises additional pore forming agents to enhance and control porosity and pore sizes. Suitable pore forming agents include organic compounds like higher boiling (i.e. less volatile) solvents, surfactants and organic polymers, and inorganic particles having sub-micron particle size, i.e. nano-particles.

Organic compounds as pore forming agent may in initial stages after applying the coating to the substrate be present in dissolved, dispersed or other form. After drying and/or curing the coating, these compounds can be removed; for example by evaporation or exposing the coating to a solvent for the (polymeric) compound and extracting the compound from the coating. Alternatively, the pore former can be removed during thermally curing the coating at temperatures above the decomposition temperature of the compound or organic polymer. A combined treatment of dissolving and degrading/evaporating the compound, like a polymer, may also be applied.

Suitable polymers include those that can be removed from the coating, and provide the desired pore size of about 30-150 or 50-125 nm. Examples include styrenic, acrylic and olefinic polymers, including homopolymers and various copolymers. In U.S. Pat. No. 4,446,171 various suitable organic polymers are described, including PMMA, nitrocellulose, cellulose acetate butyrate, polyvinyl alcohol, and a hydroxyl-functional acrylic copolymer. Polyvinyl acetate was applied in U.S. Pat. No. 5,858,462. In EP0835849 and US2008/0241373 polyethylene oxide was used as pore former.

In the method according to the invention also inorganic nano-particles can be used as pore forming agent in the coating composition. Suitable nano-particles comprise at least one inorganic or metal oxide or fluoride, or inorganic or metal oxide or fluoride precursor. Examples of suitable particles are particles comprising lithium fluoride, calcium fluoride, barium fluoride, magnesium fluoride, titanium dioxide, zirconium oxide, antimony doped tin oxide, tin oxide, aluminum oxide, and silicon dioxide. Preferably, the metal oxide is alumina or silica. Preferably, the particles comprise silica, more preferably particles comprise at least 60 mass %, even more preferably at least 80 and most preferably at least 90 mass % silica.

The nano-particles preferably have an average particle size of below 500 nm, more preferably below 250, 125, 100, or 50 nm. Particle size is defined as 0.5×(length+width) for non-spherical particles and as the diameter for spherical particles. Preferably, the average particle size is 5 nm or more, more preferably above 7 or above 10 nm. The sizes of the particles may be determined by spreading a dilute suspension of the particles over a surface and measuring the sizes of individual particles by using microscopic techniques, preferably scanning electronic microscopy (SEM) or atomic force microscopy (AFM). Preferably the average sizes are determined by measuring the sizes of 100 individual particles.

The nano-particles may be solid, porous, or hollow. In case of solid particles, porosity in the coated layer mostly results from the space between the non-ideally packed particles not being completely filled by the binder. Preferably, particles of different shapes, or of different particle size distributions are used. Examples of such coatings are for example described in U.S. Pat. No. 2,432,484 and EP1430001, and documents cited therein. Use of porous nano-particles in the coating composition will further contribute to controlling porosity in the cured coating.

In a preferred way of performing the method according to the invention, hollow metal oxide nano-particles are used as pore forming agent. Preferably, the particles have a void size larger than 5 nm, more preferably larger than 10, 20 or 30 nm. Preferably, the hollow core is smaller than 500 nm, more preferably smaller than 250, 125, 100, or even 50 nm. Suitable particles and coating compositions are a.o. described in US20060182945.

The coating composition can also comprise core-shell nano-particles with a metal oxide shell and an organic core, which core can be removed during or after curing of the coating, similarly to the organic polymer as described above, to result in hollow particles embedded in the coating layer. Preferably, the size of the organic core is similar to the size of the hollow particles described earlier. The organic core is preferably an organic polymer, like those described above, which can be removed by solvent extraction, and/or by thermal degradation and evaporation.

Suitable core-shell particles have been described in numerous publications, including U.S. Pat. No. 5,100,471, U.S. Pat. No. 6,685,966, WO2008028640, WO2008028641, and WO2009030703, and documents cited therein.

Suitable solvents for the AR coating composition are preferably miscible with water or can at least dissolve a certain amount of water. Examples include organic solvents like ketones, esters, ethers, alcohols, and mixtures thereof. Preferably the solvent is an alcohol, more preferably a lower aliphatic alcohol like methanol, ethanol, propanol, or butanol. Ethanol and isopropanol are particularly preferred solvents.

The transparent substrate on which the AR coating composition is applied can vary widely, and can be organic or inorganic and of various geometries, but is preferably a flat rectangular sheet. Preferably, the substrate is transparent for at least visible light. Suitable substrates include inorganic glasses (e.g. borosilicate glass, soda lime glass, glass ceramic, aluminosilicate glass) and plastics (e.g. PET, PC, TAC, PMMA, PE, PP, PVC and PS) or composite materials like laminates. Preferably the substrate is a glass, like a low-iron soda-lime glass or a borosilicate glass; preferably a flat glass like float glass, or rolled glass with smooth or patterned surface.

The coating composition can be applied directly to the substrate, but also to another coating layer already present on the substrate; like a barrier layer for alkali ions, or an adhesion promoting layer.

The method according to the invention may also be used to apply more than one coating layer, with intermediate drying performed after the application of each layer. In some embodiments, intermediate drying and curing is performed after applying some or all of the layers.

The coating composition is preferably applied to the substrate for making a (single layer) AR coating in such wet thickness that will result in a thickness after drying and/or curing of about 20 nm or more, preferably the applied cured coating has a layer thickness of at least about 50 or 70 nm and of at most about 200, 180, 160 or 140 nm. In case of a multi-layer coating the skilled person may select different layer thicknesses and/or layers of different compositions and refractive index.

In the method according to the invention the steps of drying and curing the applied coating composition will comprise drying to evaporate at least part of solvent(s) and other volatile components, and then curing to complete reaction of a binder into for example inorganic oxide(s), and optionally removing residual and non-volatile organic components.

Drying preferably takes place under ambient conditions (e.g. 15-30° C.), although elevated temperatures (e.g. up to about 250° C., more preferably up to 100, 50 or 40° C.) may also be used to shorten the total drying time. Drying may be promoted by applying an inert gas flow, or reducing pressure. Specific drying conditions may be determined by a person skilled in the art based on solvent or diluent to be evaporated.

After drying, i.e. after substantially removing volatile components, the applied layer is preferably cured. Curing may be performed using a number of techniques including thermal curing, flash heating, UV curing, electron beam curing, laser induced curing, gamma radiation curing, plasma curing, microwave curing and combinations thereof. Curing conditions are depending on the coating composition and curing mechanism of the binder, and on the type of substrate. The skilled person is able to select proper techniques and conditions. Thermally curing coatings at e.g. temperatures above 120, or above 250° C. is preferred for inorganic oxide precursors as binder. Such conditions are often not possible for a plastic substrate. In such case flash heating may advantageously be applied to minimise exposure of the substrate to high temperature; as is for example described in WO2012037234.

After curing the coating, residual organics including organic pore forming agent can be optionally (further) removed by known methods; for example by exposing the coating to a solvent and extracting the organic compound from the coating. Alternatively, an organic compound or polymer can be removed by heating at temperatures above the decomposition temperature of the organic polymer. Suitable temperatures are from about 250 to 900° C., preferably above 300, 400, 450, 500, 550 or 600° C., during at least several minutes. Such heating will also promote formation of oxides from inorganic oxide precursors, especially when in the presence of oxygen; resulting in both curing and removing organics by calcination.

In a preferred embodiment, organics are removed by heating combined with thermally curing the coating. For example, in case of an inorganic glass substrate curing can be performed at relatively high temperatures; of up to the softening temperature of the glass. Such curing by heating is preferably performed in the presence of air, and is often referred to as firing in e.g. glass industry. If desired, the air may comprise increased amounts of water (steam) to further enhance curing and formation of an inorganic oxide coating. The product obtained by such method is typically a fully inorganic porous coating.

In a further preferred embodiment, such curing step is combined with a glass tempering step; i.e. heating the coated glass substrate to about 600-700° C. during a few minutes, followed by quenching, to result in AR-coated toughened or safety glass.

The invention further relates to an AR coated transparent substrate that is obtainable by (or is obtained with) the method according to the invention and as described herein above, including all combinations and perturbations of indicated features and embodiments.

An anti-reflective or light reflection reducing coating is a coating that reduces the reflection of light from the surface of a substrate relative to uncoated substrate; preferably at one or more wavelengths in the visible range between 425 and 675 nm.

Typically, the AR coated substrate obtainable by the method according to the invention shows good AR properties, in combination with small edge areas with defects visible to the human eye. Preferably, such AR coated substrate has edge areas of at most 10 mm wherein defects are visible, more preferably of at most 8, 6 or 5 mm.

The AR coated substrate according to the invention may be used in many different applications and end-uses, like window glazing, cover glass for solar modules, including thermal and photo-voltaic solar systems, or cover glass for TV screens and displays. The invention thus further relates to an article comprising the AR coated substrate obtained with the method according to the invention. Examples of such articles include solar panels, like a thermal solar panel or a photo-voltaic module, monitors, touch-screen displays for mobile phones, tablet pc's or all-in-one pc's, and TV sets.

Throughout the description and claims of this specification, the words "comprise" and "contain" and variations of the words, for example "comprising" and "comprises", means "including but not limited to", and is not intended to (and does not) exclude other additives, components, parts, integers or steps.

Throughout the description and claims of this specification, the singular encompasses the plural unless the context requires otherwise. In particular, where the indefinite article is used, the specification is to be understood as contemplating plurality as well as singularity, unless the context requires otherwise.

Features, integers, characteristics, compounds, parts, process conditions etc. as described in conjunction with a particular or preferred aspect, embodiment or example of the invention are to be understood to be applicable to any other aspect, embodiment or example described herein unless stated otherwise or obviously incompatible therewith.

The invention will be further illustrated by the following experiments, without being limited thereto.

Roll Coating

Two different types of glass sheets were used as substrate:

| | |
|---|---|
| G1 | 2 mm thick float glass; 650 × 450 mm; with seamed or K-edges (Ultra White ™ from Guardian) |
| G2 | 3.2 mm thick structured glass with matt finish; 900 × 650 mm; with rounded or C-edges (SILK from GMB Interfloat, DE) |

As coating liquid an AR coating composition available as KhepriCoat® (DSM Advanced Surfaces BV, NL) was applied.

A RCLM-1300 forward roll coating apparatus (Buerkle GmbH, DE) was used for all tests. The apparatus was equipped with an applicator roll having a surface covering made from 50 Shore A EPDM rubber (5By1, grey) and provided with 96TPI/70° V-shaped grooves. A dosing roll and backing roll with smooth chromium-plated surfaces were used. Coated sheets were taken up and forwarded by an outlet table having multiple rolls.

Experiments were performed at a glass forwarding speed of 8 m/min; and with applicator roll and dosing roll rotating at 8 m/min. The gap between applicator roll and backing roll was set 1.0±0.1 mm smaller than the thickness of the glass sheet being processed. The dosing roll was pressed to the applicator roll to result in about 0.45±0.05 mm deformation of the rubbery surface.

After applying the wet coating layer, sheets were dried at room temperature during at least 5 min., and cured during 2-4 min. at 650° C.

In order to classify reduction of the "fat edge" effect at the trailing end of a glass sheet following three categories were used:

| | |
|---|---|
| Hard | Heavy, thick edge layer; resulting in clearly deviating edge coating after drying/curing |
| Medium | Medium edge layer; visible colour difference in dried/cured coating |
| Soft | Slight variation in thickness; visibly different, but showing AR properties after drying/curing |

Coated sheets were visually evaluated and classified, and the edge layer width was measured manually. Width of soft edge is given as combined medium+soft edge. Results are reported as average values (avg) with standard deviation (std) and number of sheets evaluated (n).

COMPARATIVE EXPERIMENT A

Glass sheets of type G1 were coated as indicated above. The coated sheet showed a thick deviating trailing edge layer after drying and curing, having different hue and being hazy. This edge defect had a width of about 16 mm; see Table 1. Such type of fat edge band is commercially unacceptable.

EXAMPLE 1

Comparative Experiment (CE) A was repeated, but in this case the rolls of the outlet table were not driven, and covered with several layers of silk paper (21 g/m²; from Brangs & Heinrich BV, NL) The glass sheets now slide over the paper and are not actively forwarded. The number of paper layers and height of outlet table were adjusted such that the sheet came to a stop when leaving the applicator roll, and a meniscus of coating liquid still was maintained between roll and sheet. After a few seconds the meniscus started to disappear from one side to the other over the full width of the sheet, and coating liquid was visibly taken away by the rotating applicator roll. After about 10 s the meniscus appeared to have gone away, then the coated sheet was removed, and a new sheet fed.

As shown in Table 1, a significant reduction in edge defects resulted; with a visibly deviating edge area and transition zone of a few mm. Such type of edge band is generally acceptable in the market, e.g. for solar applications.

COMPARATIVE EXPERIMENT B AND EXAMPLE 2

CE A and Example 1 were repeated using the G2 type of glass sheets. Without stopping the sheets directly after the applicator roll again a fat edge resulted.

Example 2 was performed as Example 1, but included moving the applicator roll upwards about 2.0 mm at the moment the sheet stopped on the outlet table covered with silk paper (while initially maintaining a meniscus). The coated sheets showed a narrow medium edge band, gradually changing into an area that only showed minor difference in reflection colour.

EXAMPLE 3

Example 2 was repeated, but now also the set value for dosing roll pressure was increased with 0.1 mm when the sheet had passed the applicator roll halfway (to reduce amount of coating dosed to the applicator roll). The resulting sheets showed only a medium edge area of less than 8 mm.

TABLE 1

| | | Trailing edge evaluation | | | | | |
|---|---|---|---|---|---|---|---|
| | | Hard | | Medium | | Medium + Soft | |
| Experiment | Glass | avg (mm) | std | avg (mm) | std | avg (mm) | std | n |
| CE A | G1 | 16.4 | 1.4 | — | | — | | 7 |
| Ex 1 | G1 | — | | 4.0 | 1.4 | 6.7 | 2.8 | 14 |
| CE B | G2 | 11.0 | 0.7 | — | | — | | 5 |
| Ex 2 | G2 | — | | 4.6 | 1.0 | 16.1 | 2.2 | 10 |
| Ex 3 | G2 | — | | 7.7 | 2.2 | — | | 9 |

The invention claimed is:

1. A roll coating process for applying a coating layer on a non-continuous sheet, the method comprising the steps of:
   (a) positioning the sheet relative to a rotatable applicator roll and an opposed backing roll such that the applicator roll is located above a top surface of the sheet;
   (b) supplying a liquid coating composition to an application surface of the applicator roll; and
   (c) applying the liquid coating composition to the top surface of the sheet by transporting the sheet horizontally between the applicator roll and the backing roll with a coated sheet forwarder and rotating the applicator roll so as to transfer the liquid coating composition from the application surface of the applicator roll onto the top surface of the sheet to form a top-coated sheet; wherein step (c) comprises the steps of:
      (i) interrupting the forwarding of the top-coated sheet by the coated sheet forwarder by stopping the top-coated sheet after a trailing edge of the sheet passes the application surface of the applicator roll,
      (ii) maintaining a meniscus of liquid coating composition between the trailing edge of the sheet and the application surface of the applicator roll when the sheet is stopped and the applicator roll continues to rotate, and
      (iii) restarting forwarding of the top-coated coated sheet by the coated sheet forwarder when the meniscus has disappeared between the trailing edge of the sheet and the application surface of the applicator roll.

2. The roll coating process according to claim 1, wherein the sheet is rectangular.

3. The roll coating process according to claim 1, wherein the sheet is a transparent glass plate.

4. The roll coating process according to claim 1, wherein the process is a forward roll coating process.

5. The roll coating process according to claim 1, wherein the applicator roll has a surface layer made from an elastomeric material.

6. The roll coating process according to claim 1, wherein the applicator roll has a surface engraved structure.

7. The roll coating process according to claim 6, wherein the surface engraved structure of the applicator roll comprises V-shaped grooves.

8. The roll coating process according to claim 1, wherein the process comprises applying the liquid coating composition to the application surface of the applicator roll with a dosing device.

9. The roll coating process according to claim 5, wherein step (c) comprises interrupting the forwarding of the top-coated sheet by the coated sheet forwarder at a position such that the sheet does not deform the surface of the application surface of the applicator roll.

10. The roll coating process according to claim 1, wherein step (c) comprises interrupting the forwarding of the coated sheet by the coated sheet forwarder after the trailing edge of the top-coated sheet passes the applicator roll and simultaneously upwardly moving the applicator roll.

11. The roll coating process according to claim 1, wherein the process applies an optical coating layer onto the top surface of the sheet.

12. A method for making an anti-reflective coated transparent substrate comprising the steps of applying a coating layer of a liquid anti-reflective coating composition to the substrate with the roll coating process according to claim 1, and drying and curing the applied coating layer.

13. A roll coating process for applying a coating layer on a non-continuous sheet, the method comprising the steps of:
   (a) positioning the sheet relative in a gap between a deformable application surface of a rotatable applicator roll and an opposed backing roll such that the applicator roll is located above a top surface of the sheet with the deformable application surface layer thereof in contact with the top surface of the sheet such that the deformable application surface is deformed by the contact with the top surface of the sheet;
   (b) supplying a liquid coating composition to the deformable application surface of the applicator roll; and
   (c) applying the liquid coating composition to the top surface of the sheet by transporting the sheet horizontally between the applicator roll and the backing roll with a coated sheet forwarder while maintaining the deformable contact between the deformable application surface layer of the applicator roll and the top surface of the sheet and rotating the applicator roll so as to transfer the liquid coating composition from the deformable application surface of the applicator roll onto the top surface of the sheet to form a top-coated sheet; wherein step (c) comprises the steps of:
      (i) interrupting the forwarding of the top-coated sheet by the coated sheet forwarder by stopping the top-coated sheet after a trailing edge of the sheet passes the deformable application surface of the applicator roll such that the deformable application surface of the applicator roll is no longer deformed by the trailing edge of the sheet,
      (ii) maintaining a meniscus of liquid coating composition between the trailing edge of the sheet and the deformable application surface of the applicator roll when the sheet is stopped and the applicator roll continues to rotate, and (iii) restarting forwarding of the top-coated coated sheet by the coated sheet forwarder when the meniscus has disappeared between the trailing edge of the sheet and the deformable application surface of the applicator roll.

14. The roll coating process according to claim 13, wherein the deformable surface layer of the applicator roll is made from an elastomeric material.

15. The roll coating process according to claim 13, wherein step (c) comprises interrupting the forwarding of the coated sheet by the coated sheet forwarder after the trailing edge of the top-coated sheet passes the applicator roll and upwardly moving the applicator roll.

16. The roll coating process according to claim 15, wherein the applicator roll is upwardly moved relative to the top-coated sheet either sequentially after or simultaneously with the stopping of the top-coated sheet.

17. The roll coating process according to claim 13, wherein after stopping the top-coated sheet such that the deformable application surface of the applicator roll is no longer deformed by the trailing edge of the top-coated sheet, the process comprising moving the top-coated sheet backwards towards the deformable application surface.

18. The roll coating process according to claim 17, wherein the top-coated sheet is stopped at a position so as to cause the meniscus to disappear between the trailing edge of the top-coated sheet and the deformable application layer of the applicator roll, and wherein moving the trailing edge of the top-coated sheet backwards towards the deformable application layer of the applicator roll causes the meniscus to reform therebetween.

\* \* \* \* \*